US012634822B2

(12) United States Patent
McRae

(10) Patent No.: US 12,634,822 B2
(45) Date of Patent: May 19, 2026

(54) ELECTRONIC MONITORING SYSTEM IMPLEMENTING COORDINATED WAKING OF WIRELESS BATTERY-POWERED MONITORING DEVICES

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 646 days.

(21) Appl. No.: 17/896,349

(22) Filed: Aug. 26, 2022

(65) Prior Publication Data

US 2023/0068136 A1 Mar. 2, 2023

Related U.S. Application Data

(60) Provisional application No. 63/237,842, filed on Aug. 27, 2021.

(51) Int. Cl.
*H04W 52/02* (2009.01)

(52) U.S. Cl.
CPC ... *H04W 52/0229* (2013.01); *H04W 52/0248* (2013.01)

(58) Field of Classification Search
CPC ......... H04W 52/0229; H04W 52/0248; H04W 52/0245; H04W 52/028; H04W 52/0254
See application file for complete search history.

(56) References Cited

U.S. PATENT DOCUMENTS

| | | | | |
|---|---|---|---|---|
| 2008/0266121 A1* | 10/2008 | Ellul | ...................... | G08B 7/066 |
| | | | | 340/584 |
| 2017/0339570 A1 | 11/2017 | Hui et al. | | |
| 2018/0158315 A1 | 6/2018 | Sloo et al. | | |
| 2018/0167224 A1* | 6/2018 | Brandt | .................. | H04W 48/10 |
| 2018/0210536 A1* | 7/2018 | Messely | ............... | G06F 1/3231 |

(Continued)

FOREIGN PATENT DOCUMENTS

| | | |
|---|---|---|
| DE | 102020212913 | 4/2021 |
| EP | 2765434 | 8/2014 |

(Continued)

*Primary Examiner* — Sharmin Chowdhury
(74) *Attorney, Agent, or Firm* — Boyle Fredrickson, S.C.

(57) ABSTRACT

An electronic monitoring system implements a coordination of power state changes amongst multiple battery-powered monitoring devices, which may simultaneously wake multiple monitoring devices from lower powered sleep states to higher powered awake states upon detection of a triggering event by a single monitoring device. This implementation may be achieved with the initial event-detecting device awakening upon detecting the triggering event and transmitting a peer-wake signal to command the waking of the non-detecting monitoring devices. The initial event-detecting device may define an awake-active state in which it performs a response action, which may include capturing images, video, sound, or transmitting corresponding data within the system. Each non-detecting device may define an awake-ready state in which the non-detecting device is fully capable of performing the response action upon detection of a subsequent triggering event by the non-detecting device.

15 Claims, 8 Drawing Sheets

(56)  References Cited

U.S. PATENT DOCUMENTS

| 2018/0278897 | A1 |   | 9/2018 | Seaman et al. |
| 2019/0164410 | A1 | * | 5/2019 | Honjo ................. G08B 19/005 |
| 2020/0284844 | A1 |   | 9/2020 | Kawamoto et al. |

FOREIGN PATENT DOCUMENTS

| EP | 3624297 | 3/2020 |
| WO | 2020184513 | 9/2020 |

* cited by examiner

STATE CHART

| STATE | POWER CONSUMPTION | | MODE INITIATION | | ACTIVITY / FUNCTION | |
|---|---|---|---|---|---|---|
| | LOW | HIGH | SELF | PEER | RESPONSE ACTION | PRE-RESPONSE MONITORING |
| SLEEP | X | | X | | | X |
| AWAKE — ACTIVE | | X | X | | X | |
| AWAKE — READY | | X | | X | | X |

ELECTRONIC MONITORING SYSTEM IMPLEMENTING COORDINATED WAKING OF WIRELESS BATTERY-POWERED MONITORING DEVICES

CROSS-REFERENCE TO A RELATED APPLICATION

This application claims the benefit of provisional patent application U.S. App. No. 63/237,842 filed on Aug. 27, 2021 and entitled "Electronic Monitoring System Implementing Coordinated Waking of Wireless Battery-Powered Monitoring Devices", the entire contents of which are hereby expressly incorporated by reference into the present application.

BACKGROUND OF THE INVENTION

1. Field of the Invention

The present invention relates to an electronic monitoring system and, more particularly, to an electronic monitoring system with multiple battery-powered electronic devices. Further, the invention relates to such a system that can conserve battery power by implementing lower power states while enhancing readiness of the system's overall monitoring capabilities by coordinating awakening of multiple devices to higher power states upon detection of a triggering event by a single one of the devices.

2. Discussion of the Related Art

Security and other monitoring systems are increasing in popularity and technical sophistication. Recent monitoring systems implemented through WLANs (wireless local area networks) have simplified hardware mounting and installation by eliminating various hardwired signal-conducting wires. Such systems typically include one, and more typically several monitoring devices, such as cameras and sensors, that communicate wirelessly with a base station hub, for example, by way of a Wi-Fi™ communications protocol, where the base station hub is in communication with a wide area network (WAN), typically via the Internet. The base station hub also communicates wirelessly with one or more user devices such as a smart phone, and possibly with an external server such as a cloud-based server.

Other improvements of monitoring systems include enhanced versatility corresponding to the development of different types of monitoring devices that can collectively provide a more comprehensive security or monitoring experience.

Although wireless communications and enhanced versatility increase the number of mounting options for monitoring devices, mounting options remain constrained by their ability to power the devices. Similar to the trends toward simplifying hardware mounting and installation by eliminating hardwired signal-conducting wires, efforts have been made to eliminate hardwired electrical power conducting wires by energizing the devices with batteries.

However, battery powered monitoring devices can present numerous challenges because at least some device features can consume substantial amounts of power, which can lead to frequent battery charging or battery changing events. Accessing the devices for such battery maintenance can be inconvenient, and the device's particular monitored zone may be left un-monitored while awaiting or performing such battery maintenance because the device is de-energized.

In order to address power consumption challenges, some devices implement battery management strategies that include placing the devices in lower power modes, such as deep sleep states, that reduce functionality to minimize power consumption when enhanced functionality is not required. When in the sleep mode, high-power draw functionalities, such as video capture and transmission, are disabled. However, awakening a monitoring device from a lower power state to a higher power state in which these high-power draw functionalities are activated takes time, which creates a time lag between initiating awaking and the monitoring device being fully functional to perform its monitoring function and any corresponding response actions. Those response actions may include, for example, capturing images, video, and/or sound; transmitting corresponding images, video, and/or sound data within the system; providing an alarm-type notice such as an audible or visual alert at the monitored environment; and/or a notifying a user device of the system. Any such response actions may be delayed or missed if the device is in its reduced functionality state during sleep mode or the process of waking to the fully functional state.

Using a camera as an example of a monitoring device that may take between 2-5 seconds to awake from a lower power sleep state to a higher power awake state, the camera may be unable to record the first 2-5 seconds of the event that triggered its awaking, potentially resulting in the event going undetected or under-detected.

Accordingly, a need exists to allow a wirelessly communicating and battery-powered electronic device to use battery management to minimize battery power usage through implementing a lower power state while at the same time enhancing the device's ability to enter a higher power state with a reduced amount of undetected or under-detected events experienced by the device.

A need also exists to provide a monitoring system and process with reduced overall lag between a triggering event that causes enhanced system functionality and full functionality of the system as a whole or at least a part of the system that includes additional monitoring devices.

SUMMARY OF THE INVENTION

In accordance with a first aspect of the invention, at least some of the above-discussed challenges are addressed by an electronic monitoring system with multiple wireless and battery-powered monitoring devices that can be collectively awakened from a lower power state to a higher power state in a coordinated manner based on a triggering event that is initially detected by a single device or fewer than all of the devices. This may allow for overall reduced battery usage within the system by maintaining a set of monitoring devices in a lower power state and commanding entry of temporary higher power states of the monitoring devices in the set based on notification of activity from the initial event-detecting device.

In accordance with another aspect of the invention, when an initially-awakened device detects a triggering event, it awakens from a lower power state to a higher power state and also sends a signal that commands awakening of at least some of the other devices, changing their states from lower power states to higher power states. This expedites the activation or awaking of other devices into their full operability and increases a likelihood that such other devices will be able to detect at least a portion of the triggering event or an entire follow-up event(s) that are within their detection zone(s). The triggering event may be an event, such as motion or a sound, occurring within the zone monitored by the monitoring device. The triggering event could also be the receipt of a signal from a user device or a third party device. After a coordinated awakening of the monitoring devices, the system may maintain the devices in the higher power state(s) for a specified amount of time, then return to the lower power state(s) if no further detectable events occur.

In accordance with another aspect of the invention, an electronic monitoring system is provided that implements a control methodology that coordinates power state changes to simultaneously wake multiple monitoring devices from lower powered sleep states to higher powered awake states. This may be achieved with an initial event-detecting device waking itself upon detecting a triggering event and transmitting a peer-awake signal to command the awakening of other monitoring devices. The initial event-detecting device may define an awake-active state in which it performs a response action, which may include capturing images, video, sound, or transmitting corresponding data within the system. Additional non-detecting device(s) may define an awake-ready state in which its systems are fully enabled and ready for action without need for further power-up or booting.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 7 is state chart showing various operational states and characteristics of monitoring devices of the system of FIG. 1 in accordance with an aspect of the invention.

DETAILED DESCRIPTION OF THE PREFERRED EMBODIMENTS

Figure 1:
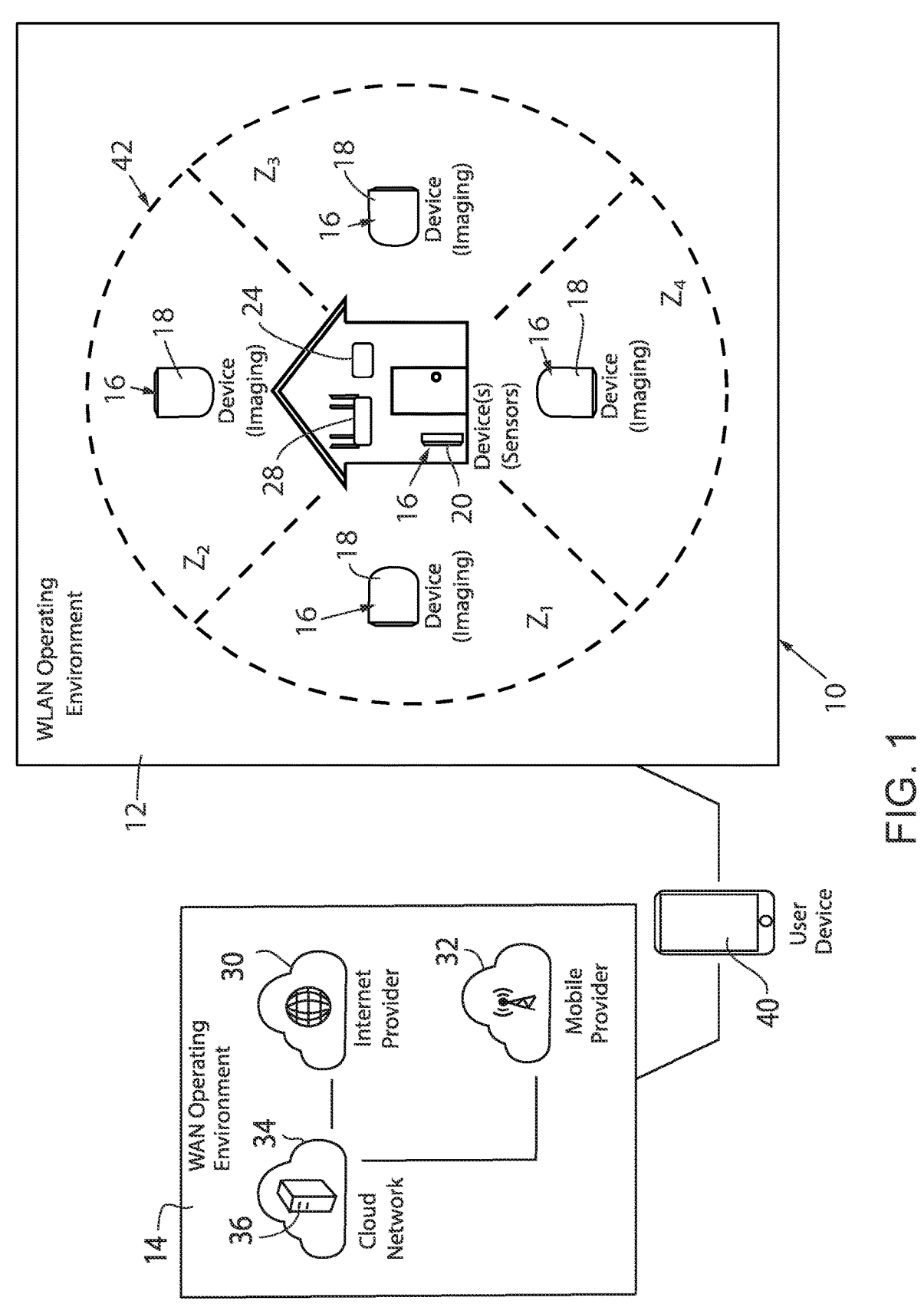
FIG. 1 is a schematic representation of an electronic monitoring system for implementing coordinated awakening of wireless battery-powered monitoring devices in accordance with an aspect of the invention.

Referring now to FIG. 1, in accordance with an aspect of the invention, an electronic monitoring system 10 is provided that is implemented in a WLAN (wireless local area network) operating environment or WLAN 12. The WLAN 12 is communicatively connected to a WAN (wide area network) operating environment or WAN 14. Within WLAN 12, various monitoring devices 16, sometimes referred to as "client devices," are wirelessly networked to a base station hub 24 which, in turn, communicates with the WAN 14 via a gateway hub shown as gateway router 28. Most systems will employ several monitoring devices 16 of the same or varying configurations as described below. Base station hub 24 may be eliminated as a stand-alone module if its functionality is incorporated into the gateway router 28, in which case the router also serves as a base station hub.

Still referring to FIG. 1, each monitoring device 16 may perform any of a variety of monitoring, sensing, and communicating functions. One such device may include an imaging device 18, such as a video camera, that is configured to capture and store visual images or video of the monitored area within the environment. One such camera is a video camera, which could be an Arlo® camera available from Arlo Technologies, Inc. of Carlsbad, California Typically, system 10 will include multiple monitoring devices 16 that are mounted to face toward respective areas or zones being monitored, such as around a building, other structure, or area. Instead of or in addition to containing a video camera or other imaging device 18, one or all of the monitoring devices 16 may include one or more sensors 20 configured to detect one or more types of conditions or stimuli, for example, motion, opening or closing events of doors or windows, sounds such as breaking glass or gunshots, the presence of smoke, carbon monoxide, water leaks, and temperature changes. The monitoring devices 16 may further include or be other devices such as audio devices, including microphones, sound sensors, and speakers configured for audio communication or providing audible alerts, such as Arlo Chime audible devices. The cameras or imaging devices 18, sensors 20, or other monitoring devices 16 also may be incorporated into form factors of other house or building accessories, such as doorbells, floodlights, etc.

Still referring to FIG. 1, gateway router 28 is typically implemented as a WIFI hub that communicatively connects WLAN 12 to WAN 14 through an internet provider 30. Internet provider 30 includes hardware or system components or features such last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub as well as the router. Another connection between WLAN 12 and WAN 14 may be provided by way of a mobile provider 32. Mobile provider 32 includes hardware or system components or features to implement various cellular communications protocols such as 3G, 4G, LTE (long term evolution), 5G, or other cellular standard(s). Both the internet provider 30 and mobile provider 32 allow the components of system 10 to interact with a backend system or control services that can control functions or provide various processing tasks of components of system 10, shown as a cloud-based backend control service system 34, which could be an Arlo SmartCloud system. The backend system, such the cloud-based control service system 34 includes at least one server 36 and typically provides, for example, cloud storage of events, AI (artificial intelligence) based processing such as computer vision, and system access to other personnel/systems such as trusted friends or family members and/or emergency services.

Still referring to FIG. 1, one or more user devices 40, such as a smart phone, tablet, laptop, or PC may communicate with various components or devices within each of WLAN 12 and WAN 14 to provide an interface through which a user may interact with system 10. Each user device 40 includes a display system that typically includes both an audio display and a video display such as a touchscreen. Each user device 40 also has internal computing and storage capabilities and a program or application, such as the Arlo Smart application, serving as the user interface with the remainder of system 10, which may include monitoring statuses within a monitored environment 42. Within monitored environment 42, different zones shown as: Z1, Z2, Z3, Z4 are defined that are monitored by corresponding monitoring devices 16 that are mounted in the zones Z1, Z2, Z3, Z4. Although only a single monitoring device 16 is shown per zone, two or more monitoring devices could provided in one or more of the zones.

Figure 2:
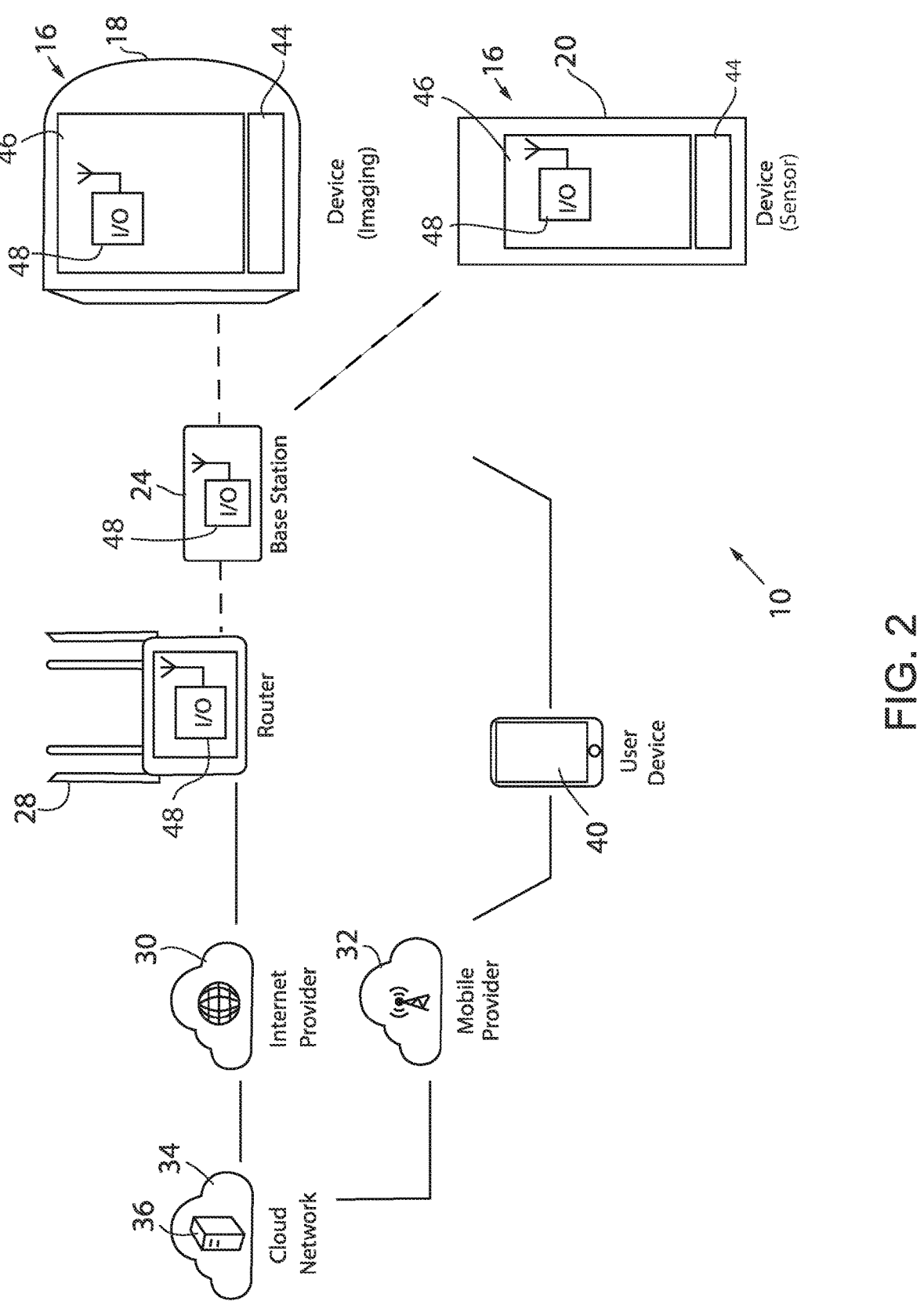
FIG. 2 is a schematic representation of portions of the system of FIG. 1 in accordance with an aspect of the invention.

Referring now to FIG. 2, each monitoring device 16 is powered by a battery 44 and has circuitry 46 that includes corresponding hardware, firmware, software, or any combination thereof. Circuitry 46 of camera-type imaging device 18 and sensor 20 may include various circuitry elements such as a media encoder, a processor, and a non-transient memory storage device. It may also contain other components, such as imagers, motion detecting, vibration, sound, or smoke detecting sensors and corresponding circuit components, or the like. Regardless of the particular type of monitoring device 16, the circuitry 46 includes wireless I/O communication devices or radios 48 for communicating with the base station 24. It is also conceivable that each radio 48, or another, dedicated radio (not shown) could communicate directly with corresponding radios of other monitoring device(s). This direct communication could be achieved via a Wi-Fi or a Bluetooth communication protocol, such as Bluetooth 5.0.

Still referring to FIG. 2, system 10 and its monitoring devices 16 are configured to implement a battery management strategy that allows the devices 16 to typically remain in a lower power consumption or sleep state while instructing short-term coordinated waking of at least some of the monitoring devices 16 into temporary higher power consumption states to expedite their readiness to respond to activity in their respective zones Z1, Z2, Z3, Z4 (FIG. 1) without requiring default high power consumption states. This is typically achieved by leveraging the collective number of sensors of the entire set or group (FIG. 1) of monitoring devices 16 to coordinate temporary waking and entry into corresponding short-term temporary higher power states of all of the monitoring devices 16 upon activity detection by a single monitoring device 16. A default operational state of monitoring device 16 may be a sleep state with a low-consumption sleep state power usage value. The sleep state typically corresponds to at least one of the monitoring device's circuitry elements entering or remaining in a reduced functionality state, which correspondingly reduces the number of energized or active components within the monitoring device 16 and provides a lower power usage value for the monitoring device 16. When the monitoring device(s) is awake, it defines an awake state with an awake state power usage value that is greater than the sleep state power usage value. The awake state is obtained when the circuitry element(s)' previously reduced functionality is restored to full functionality with a correspondingly higher awake state power usage value.

Figure 3:
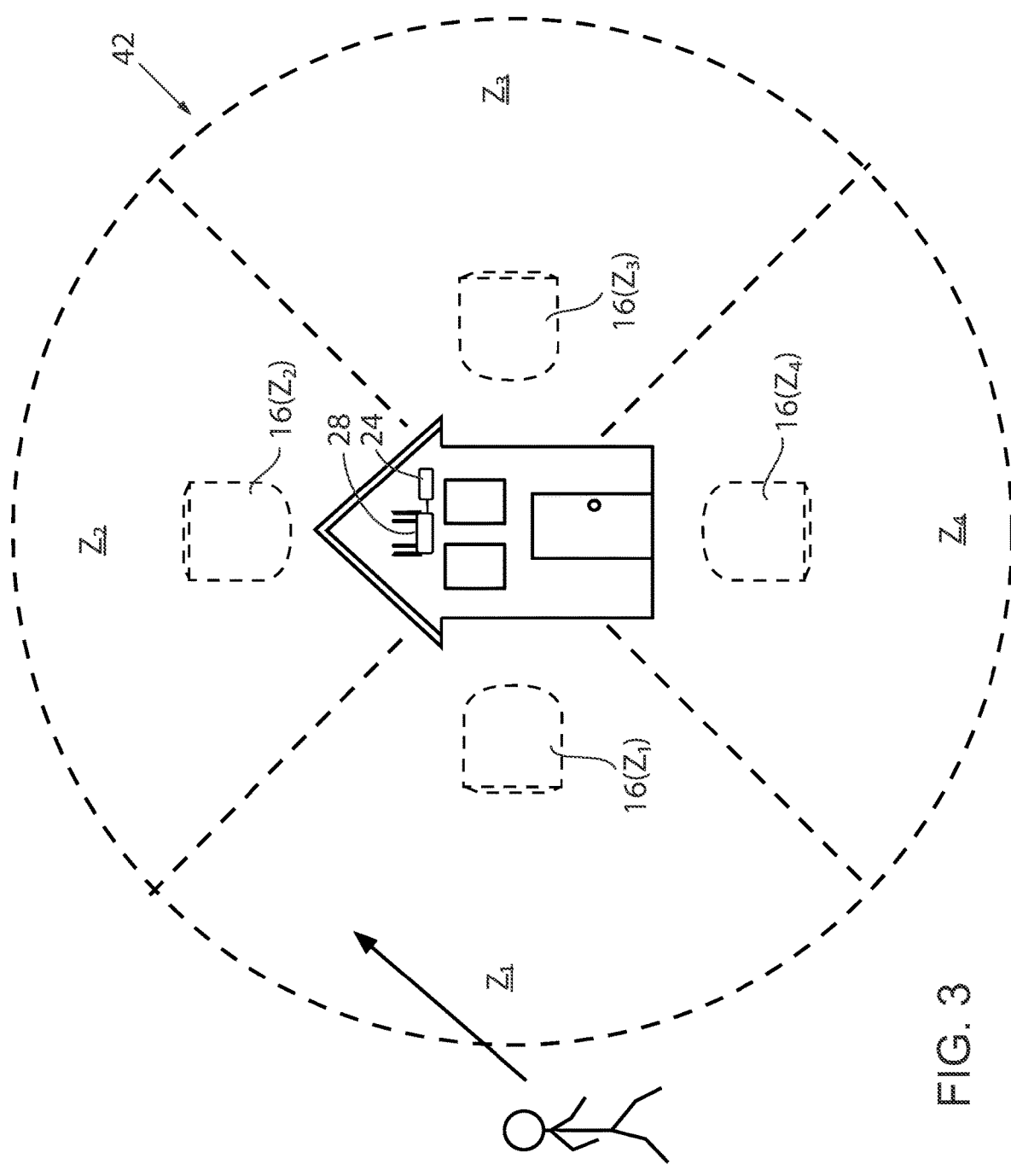
FIG. 3 is a schematic representation of a monitored environment implementing the system of FIG. 1 in accordance with an aspect of the invention.

Referring now to FIGS. 3-8, a representation of coordinated device awakening and operational mode and corresponding power usage rate switching of a set of monitoring devices 16 in zones Z1, Z2, Z3, Z4 of an environment 42 are respectively shown by way of monitoring devices 16(Z1), 16(Z2), 16(Z3), 16(Z4). Referring now to FIG. 3, all of the monitoring devices 16(Z1), 16(Z2), 16(Z3), 16(Z4) are in a sleep state, as represented by their dashed outlines, with no triggering event or activity in any of the zones Z1, Z2, Z3, Z4.

Figure 4:
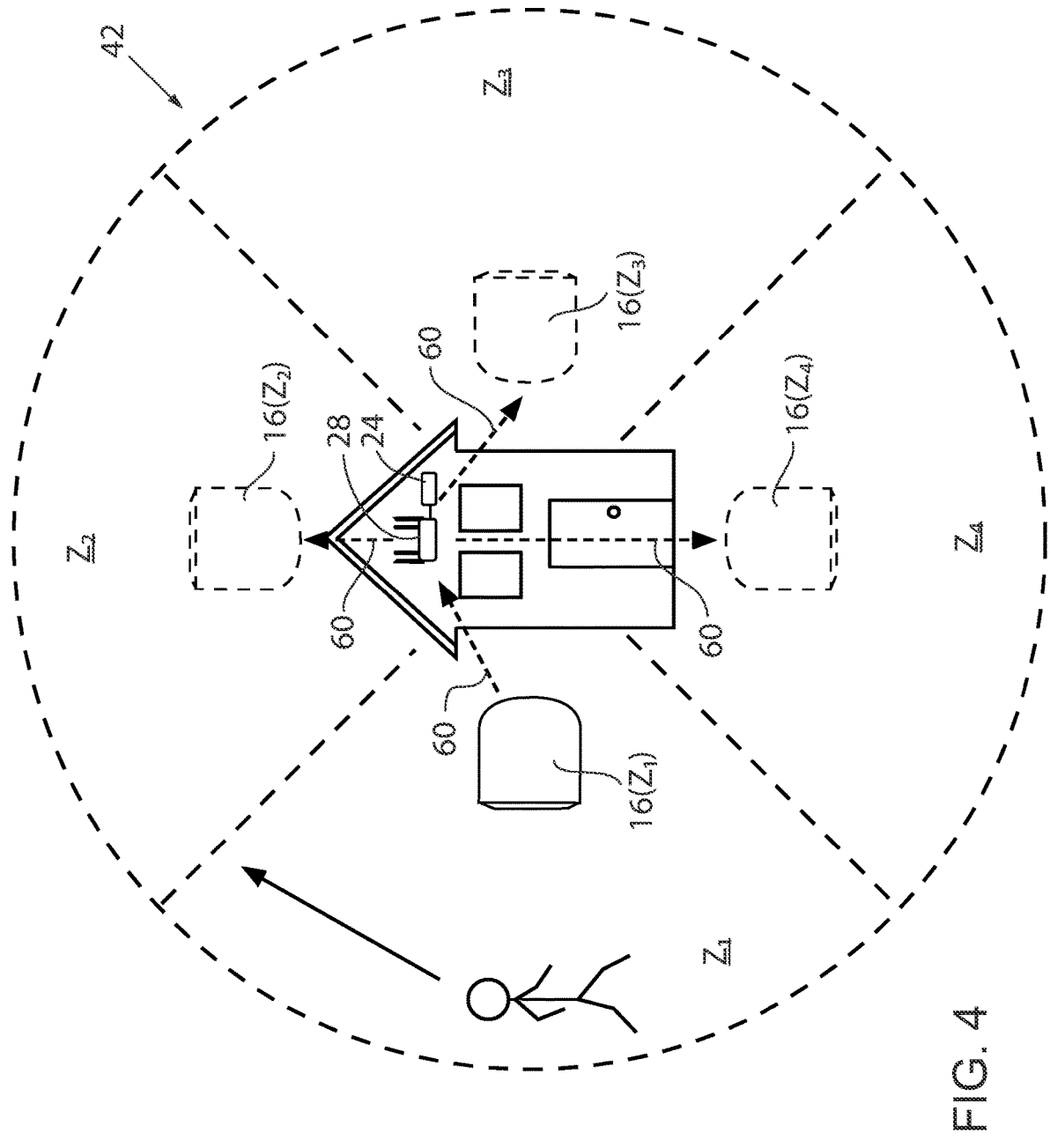
FIG. 4 is another schematic representation of a monitored environment implementing the system of FIG. 1 in accordance with an aspect of the invention.

Referring now to FIG. 4, monitoring device 16(Z1) detects a triggering event 50, shown in this case as detection of motion due to a person walking into zone Z1. Alternatively, the triggering event could be a command signal received from the user device 40 or a third party device or system. In either case, event 50 defines an out-of-zone triggering event with respect to the remaining monitoring devices 16(Z2), 16(Z3), 16(Z4) as non-detecting devices. Upon detecting the triggering event 50, the initial event-detecting monitoring device 16(Z1) awakes as shown by its solid-line representation, with the remaining non-detecting devices 16(Z2), 16(Z3), 16(Z4) remaining in their sleep states. While or immediately after awakening, the initial event-detecting device 16(Z1) transmits a peer-wake signal 60 through the system 10, which is received by each of the non-detecting devices 16(Z2), 16(Z3), 16(Z4). This signal may be relayed from the base station 24, either directly or via the router 28. It is also conceivable that the signal may be transmitted directly to the other monitoring devices, if the radio has the capability of direct communication with the other monitoring devices. In any event, the simultaneous receipt of the peer-wake signal 60 and subsequent simultaneous awakening of the non-detecting devices 16(Z2), 16(Z3), 16(Z4) provides a coordinated awakening event.

Figure 5:
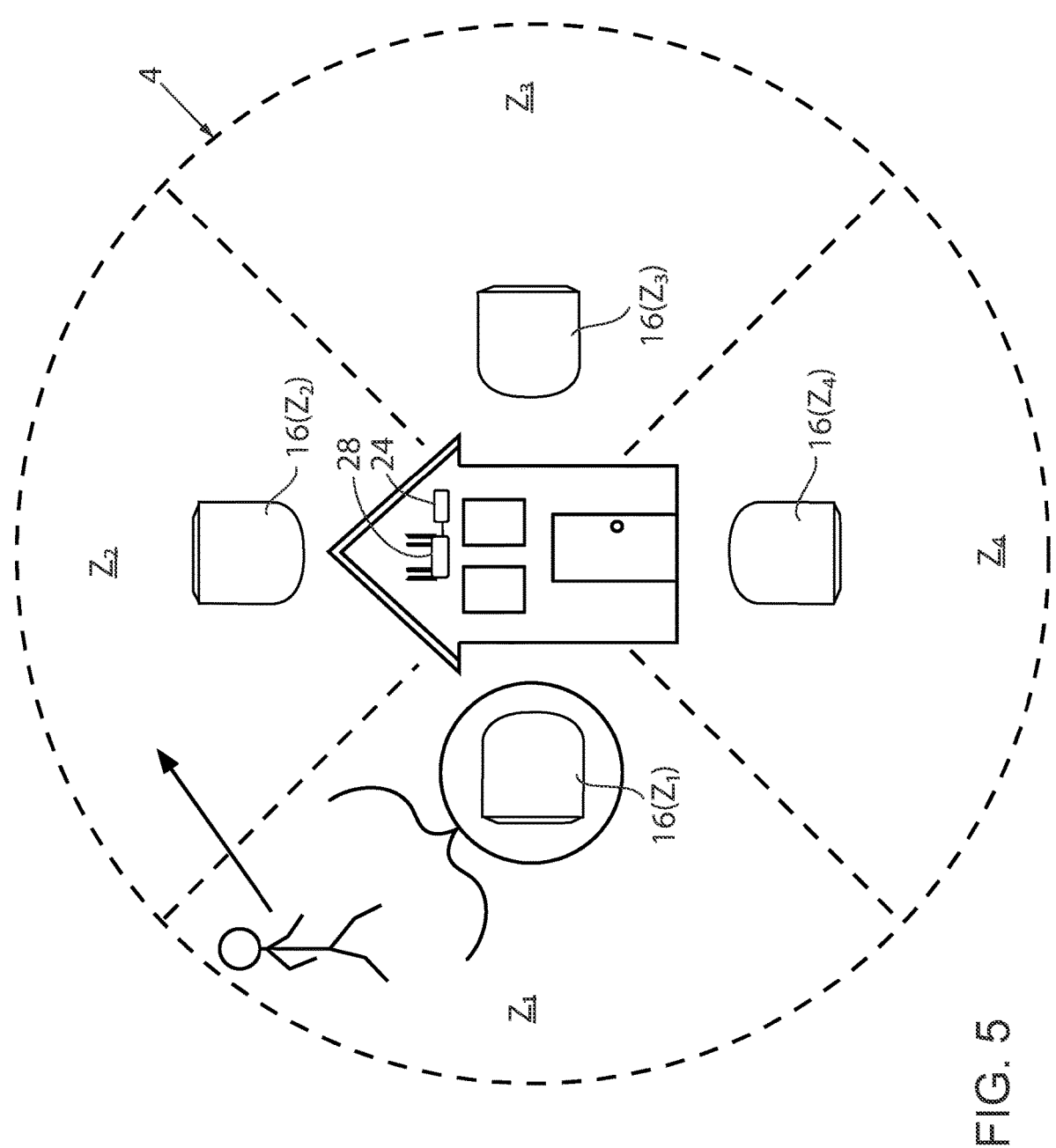
FIG. 5 is another schematic representation of a monitored environment implementing the system of FIG. 1 in accordance with an aspect of the invention.

Referring now to FIG. 5, after the initial event detecting device (16(Z1) sends the peer-wake signal 60 and the non-detecting devices receive the peer-wake signal 60, all of the monitoring devices 16(Z1), 16(Z2), 16(Z3), 16(Z4) are in awake states. The initial event-detecting device 16(Z1) may define an awake-active state, shown as an encircled solid-line representation. During this awake-active state, the monitoring device 16(Z1) performs a response action based on its detection of the in-zone triggering event 50, which may include, for example, capturing images and/or video, transmitting image and/or video data within the system 10, capturing sound, transmitting sound data within the system 10, providing a visual alert such as activating a light, providing an audible alert such as sounding an alarm, and transmitting alert information to the user device 40. The non-detecting devices 16(Z2), 16(Z3), 16(Z4) are transitioned to the illustrated awake-ready states, shown as uncircled solid-line representations. During the awake-ready state, the hardware and software required for full-device capability is fully enabled. In the case of a video camera, each camera's hardware components is powered-up and its software is booted, so it is ready to capture and transmit images without delay upon the detection of a subsequent triggering event by the corresponding device 16(Z2), 16(Z3), or 16(Z4).

Still referring to FIG. 5, while the non-detecting devices 16(Z2), 16(Z3), 16(Z4) remain in the awake-ready state, the initial event-detecting device 16(Z1) may send additional signals through the system 10 via the base station 24 and possibly the router 28 to maintain the non-detecting devices 16(Z2), 16(Z3), 16(Z4) in their awake-ready states. If the initial event-detecting device 16(Z1) determines that the triggering event 50 continues for a duration of time that exceeds a designated duration of time threshold, or if the initial event-detecting device 16(Z1) detects a subsequent event in its zone Z1 during the designated duration of time threshold, then the initial event-detecting device 16(Z1) transmits an ongoing activity signal through the system 10 indicating ongoing activity within the respective zone. Upon receiving the ongoing activity signal, each of the non-detecting devices 16(Z2), 16(Z3), 16(Z4) may maintain their awake-ready state for another session of temporary higher power consumption.

Figure 6:
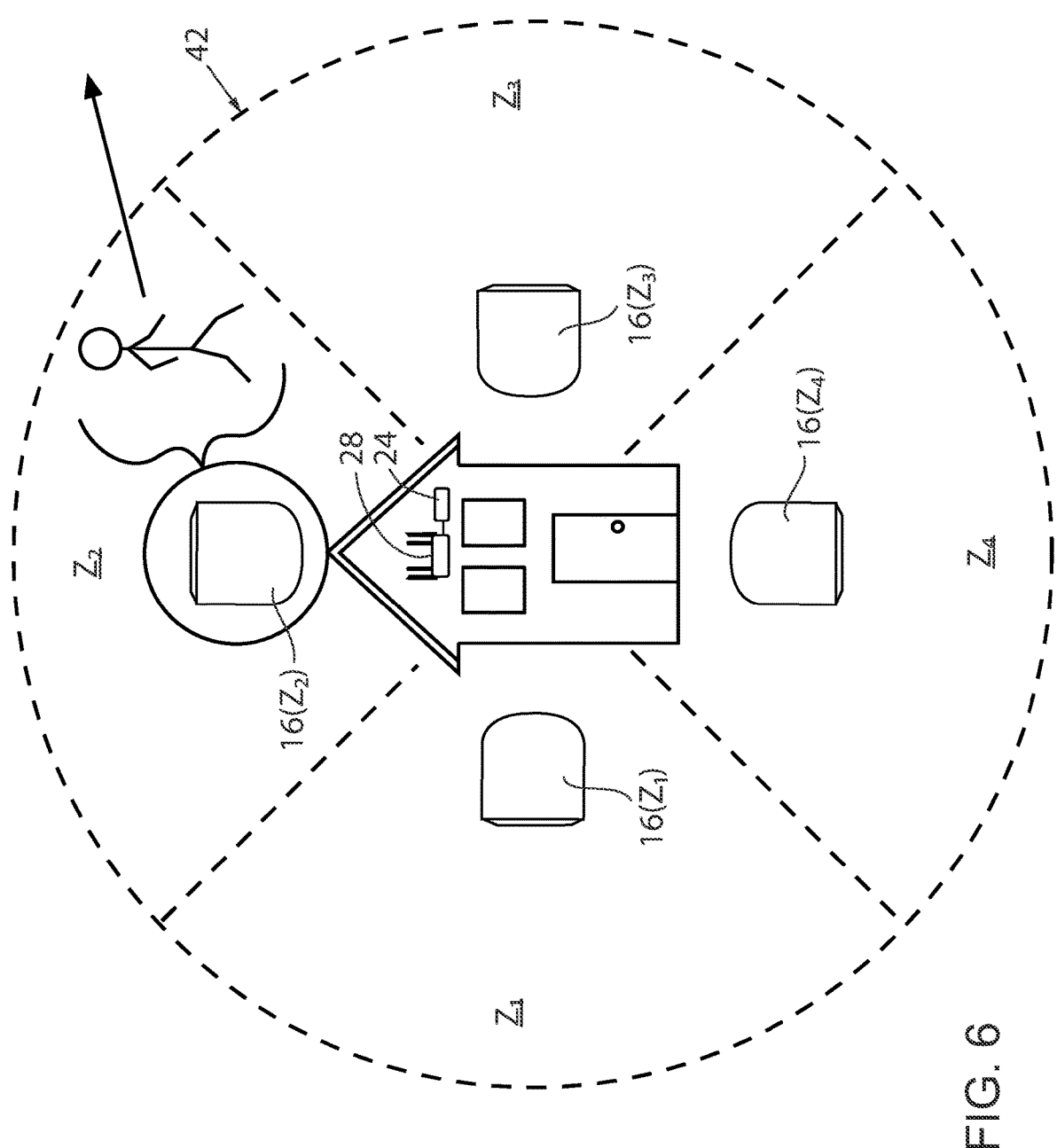
FIG. 6 is another schematic representation of a monitored environment implementing the system of FIG. 1 in accordance with an aspect of the invention.

Referring now to FIG. 6 with background reference to FIG. 5, if activity moves from one zone to another, or simply occurs in a second zone, the various monitoring devices 16(Z1), 16(Z2), 16(Z3), 16(Z4) may switch operational modes based on a current location of the activity. In the current example, as event 50 moves from zone Z1 to zone Z2, represented in a transition from FIG. 5 to FIG. 6, the initial event-detecting device 16(Z1) switches from its awake-active state to an awake-ready state. Correspondingly, when event 50 moves into zone Z2, the previously non-detecting devices 16(Z2) detects the event 50 and switches from its awake-ready state to an awake-active state, shown as an encircled solid-line representation in FIG. 6, to perform a response action based on its event detection. The role and mode transitioning of the monitoring devices 16(Z1), 16(Z2), 16(Z3), 16(Z4) continues as the activity and/or event(s) 50 remains in at least one of the zones Z1, Z2, Z3, Z4 of the monitored environment 42. When there is no longer activity and/or event(s) 50 in monitored environment 42, after a designated duration of time the set of monitoring devices 16(Z1), 16(Z2), 16(Z3), 16(Z4) revert to a sleep state with reduced functionality and lower power consumption.

It should be noted that coordinated awakening need not occur on a system-wide basis. For example, the system may be configured in groups of zones, such as a first group consisting of a house and a second zone consisting of an outbuilding such as a garage. In this case, the awakening of a monitoring device within a given one of a given group may trigger the awakening of the remaining monitoring devices within that group while leaving the monitoring devices in other group(s) in a sleep state. In this example of a first group being associated with a house and a second group being associated with a garage, detection of motion at a front door of a house may lead to the awakening of all monitoring devices of the group associated with the house while leaving the monitoring devices of the group associated with the garage in a sleep state.

Referring now to FIG. 7, this state chart shows an overview of the various operational states and characteristics of the monitoring devices 16. As shown in the power consumption columns 70, monitoring device 16 low(er) power consumption or usage is achieved during the sleep states and high(er) power consumption or usage is achieved when awake during either the awake-active or the awake-ready states. Depending on the particular configuration of monitoring device 16, the awake-active state may define a highest power usage value and the awake-ready state may define an intermediate power usage value. This may include implementations in which the monitoring device's 16 circuitry 62 requires additional electrical energy to, for example, record images or sounds, and/or transmit corresponding data during an awake-active state (highest power usage value) compared to when the associated features or circuitry element(s) may be fully booted and ready, but are idle or are not actively performing those functions during an awake-ready state (intermediate power usage value). As shown in the mode initiation columns 80, the sleep state is self-initiated. The sleep state is typically the default state of the monitoring device 16, with the monitoring device 16 returning to the default sleep state after, for example, expiration of a timer for a duration of time without detecting a triggering event in its corresponding zone. A duration for a timer expiration or a time-out value may be between thirty seconds and fifteen minutes, typically between one minute and ten minutes and, more typically, is between one minute and three minutes. The awake-active state is also typically self-initiated, with the monitoring device 16 entering the awake-active state in response to its own detection of a triggering event within its corresponding zone. The awake-ready state is peer-initiated as shown in column 80 with the monitoring device 16 awakening after receiving a peer-wake signal from a different monitoring device 16 that detected a triggering event in a different zone. The awake-active state, however, is self-activated, occurring only when the monitoring device detects a triggering event in its monitored zone. As shown in the activity/function columns 90, the monitoring device 16 performs pre-response monitoring when in both the sleep and awake-ready states and is fully enabled for full functionality when in the awake-active state. Accordingly, when in both the sleep state and the awake-ready state, the monitoring device 16 will typically monitor its respective zone in order to determine whether to initiate a boot-up activation procedure of its reduced-functionality features or circuitry elements to transition out of the sleep or reduced functionality state; or, in the case of an awake-ready state, begin using its already-booted or activated features or circuitry elements of this enhanced functionality state to react to the detected activity.

Figure 8:
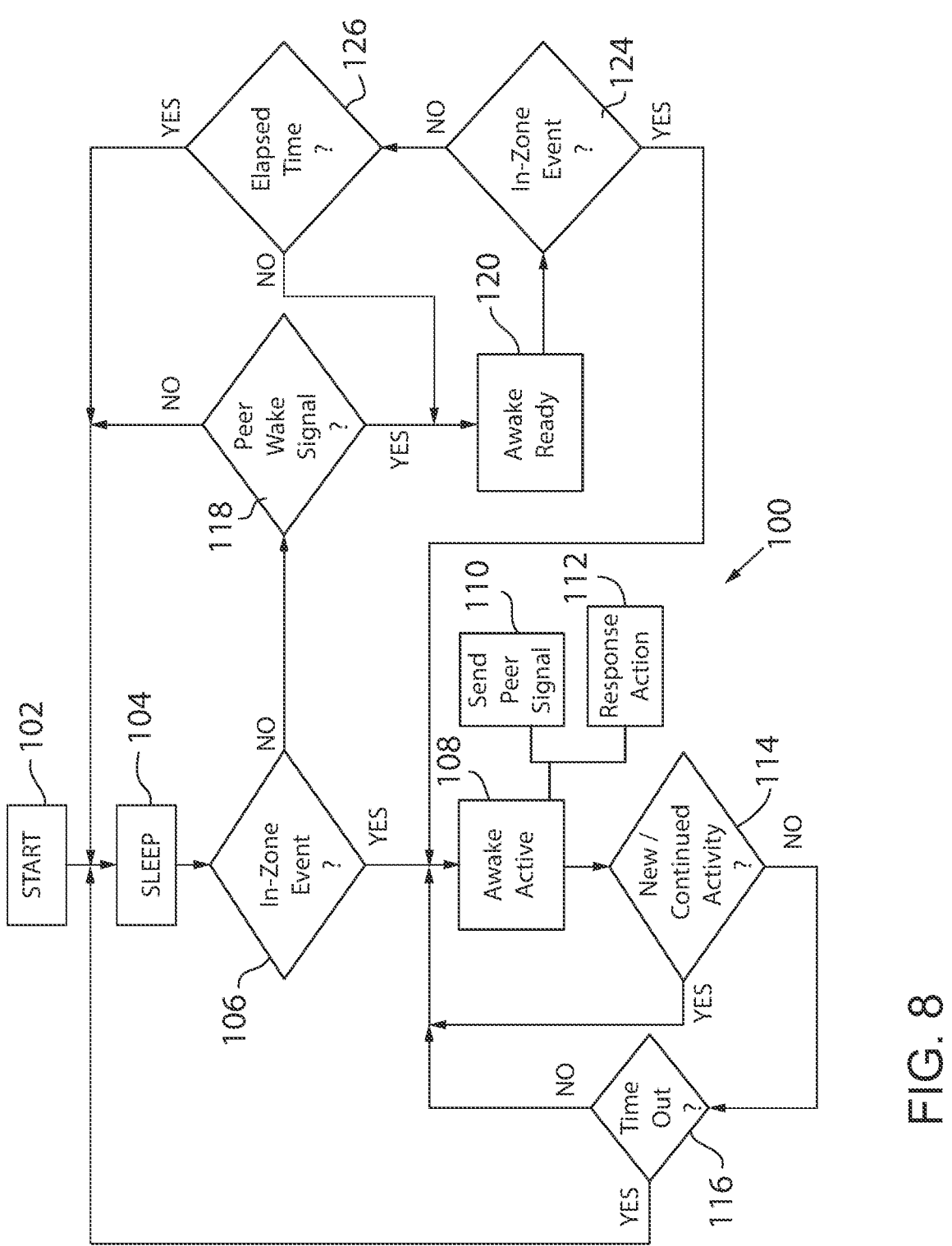
FIG. 8 is a flowchart illustrating coordinated waking of wireless battery-powered monitoring devices in accordance with an aspect of the invention.

Referring now to FIG. 8 and with background reference to FIGS. 1-3, the coordinated waking of wireless battery-powered monitoring devices is shown schematically in the flowchart as process 100, which proceeds from START at block 102. At block 104, a monitoring device 16 is in its default sleep state, with reduced functionality and a lower power usage value. At decision block 106, if the monitoring device 16 detects a triggering event in its corresponding zone, then the monitoring device enters an awake-active state at block 108. At block 110, when entering in the awake-active state, monitoring device 16 transmits a peer-wake signal through the system 10 for waking the other monitoring devices 16, which did not detect the event. As mentioned above, this signal may be transmitted to the other monitoring devices through the base station 24 or, conceivably, directly from the monitoring device 16. At block 112, the monitoring device 16 also performs a response action when in the awake-active state. In the case of the monitoring device 16 being a digital video camera, this action may comprise the capture and transmission of video image data, possibly coupled by audio data if the camera has a microphone. At decision block 114, if the awake-active monitoring device 16 detects ongoing or new activity within its zone, then it remains in the awake-active state. If the awake-active monitoring device 16 does not detect ongoing or new activity within its zone, then it executes a timer or evaluates an elapsed time versus a designated duration threshold, as represented at decision block 116. If the elapsed time does not exceed the designated duration threshold, then the monitoring device 16 remains in its awake-active state. If the elapsed time exceeds the designated duration threshold, then the monitoring device 16 returns to the sleep state.

Still referring to FIG. 8, if at decision block 106 the monitoring device 16 does not detect an in-zone event, then it determines receipt or absence of a peer-wake signal at decision block 118. If no peer-wake signal was received, then the monitoring device 16 remains in the sleep state. If the monitoring device receives a peer-wake signal, then it switches from the sleep state to an awake-ready state at block 120 so that all of its systems are powered-up and ready for action. At decision block 124, if the monitoring device 16 detects an in-zone event, it switches from the awake-ready state to the awake-active state and performs a response action(s) based on its detection of the event. In the case of a digital video camera, the actions may include, amongst other things, capture and transmission of video image data. If the monitoring device 16 does not detect an in-zone event while in the awake-ready state, then it executes a timer or evaluates an elapsed time versus a designated duration threshold, as represented at decision block 126. If the elapsed time does not exceed the designated duration threshold, then the monitoring device 16 remains in its awake-ready state. If the elapsed time exceeds the designated duration threshold, then the monitoring device 16 returns to the sleep state.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system for monitoring an environment, the electronic monitoring system comprising:
   a first battery-powered monitoring device that monitors a first zone within the environment;
   a second battery-powered monitoring device that monitors a second zone within the environment;
   wherein:
   each of the first and second battery-powered monitoring devices defines:
   an imaging device configured to capture images and/or video and transmit corresponding image and/or video data within the system;
   a sleep state with a sleep state power usage value;
   an awake state with an awake state power usage value that is greater than the sleep state power usage value; and
   each of the first and second battery-powered monitoring devices is configured to:
   detect an in-zone triggering event in the one of the first and second zones as an initial detection zone in which the respective monitoring device is arranged and to awaken from the sleep state to the awake state as an initially awakened device and perform an in-zone response action that includes capturing images and/or video in the initial detection zone upon the detection of the triggering event;
   cause a peer-wake signal to be transmitted to awaken the other one of the first and second battery-powered monitoring devices as a subsequently awakened device from the sleep state to the awake state in the other one of the first and second zones as an initial non-detection zone and prepare the subsequently awakened device to perform a subsequent response action that includes capturing images and/or video upon detection of a subsequent triggering event in the initial non detection zone; and
   transmit an ongoing activity signal through the system to maintain the subsequently awakened device in the awake state in the initial non-detection zone upon a determination of a continued duration of the triggering event or a detection of a subsequent event in the initial detection zone.

2. The electronic monitoring system of claim 1, wherein each of the first and second battery-powered monitoring devices comprises at least one circuitry element that is configured to:
   enter a reduced functionality state to provide the sleep state; and
   enter an enhanced functionality state to provide the awake state.

3. The electronic monitoring system of claim 2, wherein the active state is one of at least two active states, including:
   an awake-active state with the corresponding one of the first and second battery-powered monitoring devices performing a response action based on its detection of the in-zone triggering event; and
   an awake-ready state in which operation of the corresponding one of the first and second battery-powered monitoring devices is fully enabled such that the corresponding one of the first and second battery-powered monitoring devices is ready to perform the response action upon detection of a subsequent in-zone triggering event by the corresponding one of the first and second battery-powered monitoring devices.

4. The electronic monitoring system of claim 3, wherein the response action during awake-active state includes at least one of:
   capturing images and/or video;
   transmitting image and/or video data within the system;
   capturing sound;
   transmitting sound data within the system;
   activating a light;
   providing an audible alert; and
   transmitting alert information to a user device.

5. The electronic monitoring system of claim 1, further comprising a third battery-powered monitoring device that monitors a third zone, and wherein each of the monitoring devices is configured to transmit a peer-awaken signal to all other monitoring devices upon detection of a triggering event.

6. The electronic monitoring system of claim 1, wherein the system includes at least three battery-powered monitoring device ands, wherein each of the monitoring devices is configured to transmit a peer-awaken signal to less than all other monitoring devices upon detection of a triggering event.

7. The electronic monitoring system of claim 1, wherein the triggering event is one of the detection of activity with the zone monitored by the corresponding monitoring device or the receipt of a command from a user device or third party device.

8. An electronic monitoring system for monitoring an environment, the electronic monitoring system comprising:

at least three battery-powered imaging devices that monitor corresponding zones within the environment so that each battery-powered imaging device monitors a respective monitored zone, wherein:

during an absence of a triggering event within the environment, each of the battery-powered imaging devices is configured to maintain a sleep state with a first, relatively low power usage value, and wherein each of the battery-powered imaging devices, during an occurrence of a triggering event within the respective monitored zone, is configured to:

detect an in-zone triggering event in the respective monitored zone as an initial detection zone;

awaken from the sleep state as an initially awakened device to an awake state with a second power usage value that is higher than the first power usage value and perform an in-zone response action in the initial detection zone;

cause a peer-wake signal to be transmitted to wake at least one other battery-powered imaging device as a subsequently awakened device from a sleep state to an awake state in a different one of the monitored zones as an initial non-detection zone in preparation of performing a subsequent response action upon detection of a subsequent triggering event in the initial non-detection zone; and cause an ongoing activity signal to be transmitted to the subsequently awakened device and maintain the subsequently awakened device in the awake state in the initial non-detection zone upon a determination of a continued duration of the triggering event or a detection of a subsequent event in the initial detection zone.

9. The electronic monitoring system of claim 8, wherein each of the battery-powered imaging devices includes at least one circuitry element that is configured to:

enter a reduced functionality state to provide the sleep state; and enter an enhanced functionality state to provide the awake state.

10. The electronic monitoring system of claim 9, wherein:

the battery-powered imaging device that detects the triggering event in its respective monitored zone enters an awake-active state for performing a response action in response to detection of the triggering event; and at least one of the battery-powered imaging devices that did not detect the triggering event enters an awake-ready state in which the imaging device is fully capable of performing the response action upon detection of a subsequent triggering event in its respective zone.

11. The electronic monitoring system of claim 10, wherein:

a respective one of the battery-powered imaging devices that detects the in-zone triggering event defines an initial event-detecting device;

the initial event-detecting device is configured to determine when a duration of inactivity within the respective zone exceeds a designated duration of an inactivity time threshold, in response to exceeding the duration of the inactivity time threshold, the at least one circuitry element of the initial event-detecting device is configured to enter the reduced functionality state.

12. A method for operating multiple battery-powered imaging devices within an electronic monitoring system for monitoring an environment, the method comprising:

detecting a first triggering event in a first zone with a first battery-powered imaging device;

waking the first imaging device from a sleep state to an awake state and perform a first response action in response to detection of the triggering event in the first zone;

transmitting a peer-wake signal in response to the detection of the triggering event by the first imaging device;

receiving the peer-wake signal with a second battery-powered imaging device in a second zone; and transitioning the second imaging device from a sleep state to an awake state in response to receiving the peer-wake signal and in preparation of performing a second response action upon detection of a second triggering event in the second zone;

detecting an ongoing duration of the triggering event or a subsequent event with the first imaging device in the first zone;

transmitting an ongoing activity signal in response to the detected ongoing triggering event or subsequent event; and maintaining the second imaging device in the awake state in response to receiving the ongoing activity signal in the first zone.

13. The method of claim 12, further comprising:

detecting the triggering event with the first battery-powered imaging device in a first zone of the monitored environment; and receiving the peer-wake signal with the second battery-powered imaging device in a second zone of the monitored environment.

14. The method of claim 13, wherein:

the first and second zones of the monitored environment are defined within a first group of zones within the monitored environment; and a second group of zones is defined within the monitored environment, and the method further comprises:

performing a coordinated waking event by the transmitting the peer-wake signal and receiving peer-wake signal by respective battery-powered imaging devices in at least one of the first and second groups of zones of the monitored environment.

15. The method of claim 12, wherein:

the monitored environment includes multiple groups of zones;

a coordinated waking event is defined by:

the transmitting of the peer-wake signal;

the receiving of the peer-wake signal by respective battery-powered imaging devices; and the transitioning of the respective battery-powered imaging devices from the sleep state to the awake state; and the method further comprises:

performing the coordinated waking event in fewer than all of the groups of zones in the monitored environment based on a location of the zone in which the triggering event was detected.

\* \* \* \* \*